United States Patent Office 3,652,680
Patented Mar. 28, 1972

3,652,680
CYCLOALIPHATIC SULFIDES
Bernard Buchholz, Blue Bell, Pa., assignor to
Pennwalt Corporation, Philadelphia, Pa.
No Drawing. Filed Aug. 8, 1969, Ser. No. 848,737
Int. Cl. C07c *149/30*
U.S. Cl. 260—609 E          16 Claims

ABSTRACT OF THE DISCLOSURE

Cycloalkane bis(alkylsulfide) compounds of structure

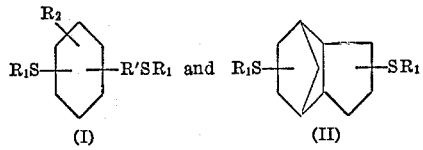

where $R_1$ is higher alkyl, $R_2$ is H or lower alkyl and $R'$ is lower alkylene and the use of these compounds in polyolefins as antioxidant-synergists.

---

It is customary to stabilize polyolefins, particularly polypropylene, against oxidative degradation by incorporating in the polyolefins a small amount of a phenolic primary antioxidant and a sulfur-containing secondary antioxidant or synergist. The sulfide synergists now used almost exclusively are dilauryl thiodipropionate (DLTDP) or distearyl thiodipropionate (DSTDP).

These known thiodipropionate esters DLTDP and DSTDP suffer from the fact that they are gradually leached out of polyolefins by hot water, particularly hot water containing soap or detergents. This gradual loss of stabilizer results in premature deterioration (embrittlement and cracking) of polyolefins when they are used for hot water pipe and tubing applications and as components in automatic laundry and dish washers, vaporizers and other hot water equipment.

The compounds of this invention are cycloalkane bis (alkylsulfides) having the general structures I and II shown below, where $R_1$ is higher ($C_8$–$C_{30}$) straight-chain alkyl, $R_2$ is H or lower ($C_1$–$C_4$) straight-chain or branched alkyl and $R'$ is lower ($C_1$–$C_4$) straight-chain or branched alkylene. These compounds exhibit high activity as antioxidant-synergists.

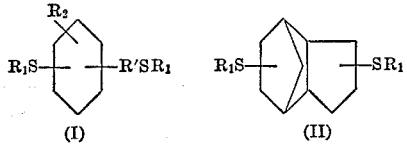

They are superior to the thiodipropionates in resistance to hot water leaching and have excellent compatibility with polyolefins.

The compounds of the invention are readily prepared from commercially available cyclic diolefins, $H_2S$ and higher molecular weight monoolefins as illustrated by the following three equations:

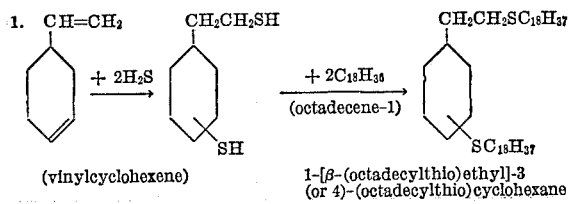

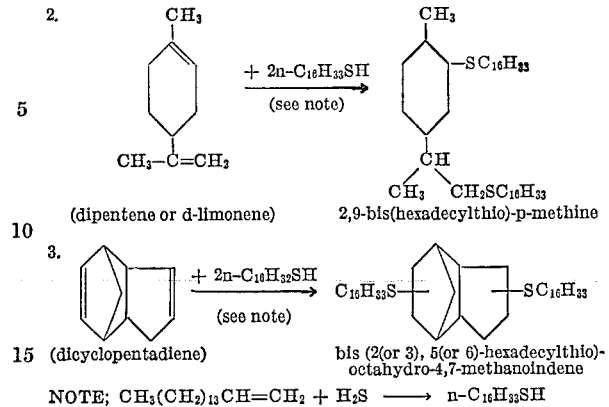

NOTE: $CH_3(CH_2)_{13}CH=CH_2 + H_2S \longrightarrow n\text{-}C_{16}H_{33}SH$

All the above reactions occur in the presence of conventional free radical catalysts such as ultraviolet light, gamma radiation, peroxides and azo compounds. The following example, corresponding to Equation 1 above, illustrates the general preparative procedure which can be used to make the compounds of the invention.

PREPARATIVE PROCEDURE

The liquid-phase reaction of 4-vinylcyclohexene-1 is carried out with excess $H_2S$ in the presence of ultraviolet light from 15 watt germicidal lamps to produce vinylcyclohexene dimercaptan ($\beta$ - mercaptoethyl - 3 (or 4)-mercaptocyclohexane), 97–9°/1.25 mm. in high yield.

A solution containing 13 grams (0.073 mol) of vinylcyclohexene dimercaptan and 37 grams (0.146 mol) of octadecene-1 in 300 cc. of methyl propyl ketone is maintained at about 5° C. while irradiating at 47.5 watts with a Nester/Faust ultraviolet lamp for 5 hours. Filtration of the precipitated solid gives 25 grams (50%) of the desired product, M.P. 67–69.5°. Recrystallization from methyl ethyl ketone gives a soft waxy white crystalline product, M.P. 71–72° C.

*Analysis.*—Calculated for $C_{44}H_{88}C_2$ (percent): C, 77.57; H, 13.02; S, 9.41. Found (percent): C, 76.90; H, 12.95; S, 9.48.

The preferred compounds are the vinylcyclohexene derivatives III

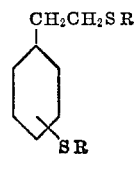

(III)

where R is $C_{12}$–$C_{28}$ straight-chain alkyl. R may be a mixture of alkyls as obtained for example by reacting the dimercaptan from vinylcyclohexene with commercially available mixtures of higher molecular weight normal alpha olefins, e.g., $C_{16-20}H_{32-40}$ and $C_{22-28}H_{44-56}$ mixtures. Particularly preferred compounds are those where R is $n\text{-}C_{12}H_{25}$, $n\text{-}C_{16}H_{33}$, $n\text{-}C_{18}H_{37}$, $n\text{-}C_{20}H_{41}$, and $n\text{-}C_{22-28}H_{45-57}$. These are white, crystalline, low melting solids, easily mixed into polypropylene and polyethylene resins by conventional methods such as dry mix-extrusion.

The compounds of the invention are further characterized by the melting points shown below:

1-[$\beta$-(dodecylthio)ethyl]-3(or 4)-dodecylthio-
  cyclohexane.
1-[$\beta$-(hexadecylthio)ethyl]-2(or 4)-hexadecylthio-
  cyclohexane.
1-[$\beta$-(octadecylthio)ethyl]-3(or 4)-octadecylthio-
  cyclohexane.

1-[β-(eicosylthio)ethyl]-3(or 4)-eicosylthio-
cyclohexane.
1-[β-(C_{22-28} thio)ethyl]-3(or 4)-C_{22-28}-thio-
cyclohexane.
2,9-bis(hexadecylthio)-p-menthane.
2,9-bis(octadecylthio)-p-methane.
bis(2(or 3), 5(or 6)-hexadecylthio)-octahydro 4,7-
methanoindene.

The compounds of the invention have low toxicity which is of value when used in polyolefin bottles and film for packaging materials. Thus, for example, 1[β-(octadecylthio)ethyl]-3 (or 4) octadecylthio-cyclohexane was found to be non-toxic when administered orally to mice at doses as high as 10 g./kg.

In using the compounds of the invenrion a synergizing amount will be employed together with the phenolic antioxidant. Usually from about 0.02 to 0.5% by weight of the formulated polyolefin will be antioxidant and from about 0.02 to 1.5% weight will be synergist. Preferably the amount of synergist used will be 0.05–0.5%.

EXPERIMENTAL

The compounds were evaluated as antioxidant-synergists in polypropylene. The polypropylene test samples were prepared by dry blending 0.1% by weight of a commercial phenolic primary antioxidant such as Ionox 320 (a) (Shell), Irganox 1010 (b) (Geigy) or Topanol CA (c) (ICI) and 0.1% or 0.25% by weight of the synergist into unstabilized polypropylene (Hercules' Profax 6501 flake), extruding into ⅛ inch rods, pelletizing, and hot pressing at 200–225° C. into 10 mil thick sheets. Unless otherwise specified all alkyl groups corresponding to $R_1$ are straight-chain alkyl.

The synergists were compared with control samples containing DSTDP in standard oven aging tests, i.e., the average hours to embrittlement of 10 mil samples in a 140° C. air-circulating oven were determined. The results are tabulated below. The data show that the subject compounds are highly active synergists, comparable to DSTDP. The data also show (Test Nos. 7 and 8) that simple higher alkyl sulfides such as $(n-C_{16}H_{33})_2S$ and $(n-C_{18}H_{37})_2S$, contrary to the disclosures in British Pat. 953,447 (1964) and Italian Pat. 662,492 (1964), are not active synergists.

(a) Ionox 330

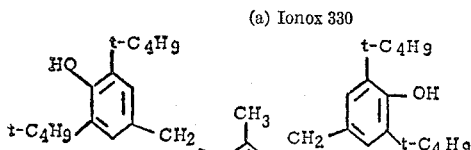

(b) Irganox 1010

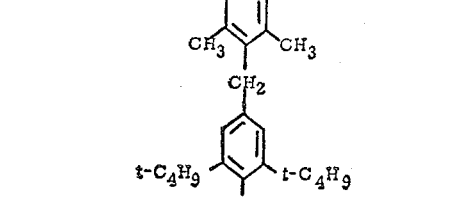

(c) Topanol CA

A 3:1 condensate of 3-methyl-6-t-butylphenol and crotonaldehyde

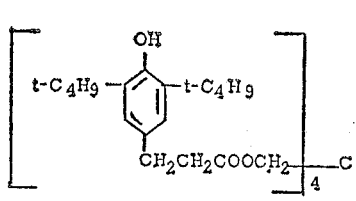

TEST NO. 1
Primary antioxidant: 0.1% Irganox 1010

Synergist: 0.1%

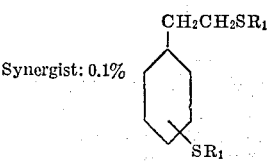

| $R_1$ | Average hours stabilization at 140° C. | Percent hours of DSTDP |
|---|---|---|
| n-C_{16}H_{33} | 1,064 | 109 |
| n-C_{18}H_{37} | 1,139 | 117 |
| n-C_{20}H_{41} | 1,091 | 112 |
| DSTDP (Control) | 976 | |

TEST NO. 2
Primary antioxidant: 0.1% Irganox 1010

Synergist: 0.25%

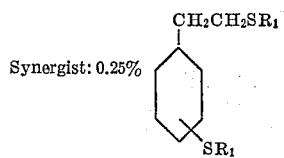

| $R_1$ | Average hours stabilization at 140° C. | Percent hours of DSTDP |
|---|---|---|
| n-C_{18}H_{37} | 1,635 | 95 |
| n-C_{20}H_{41} | 1,325 | 7 |
| DSTDP (Control) | 1,715 | |

TEST NO. 3
Primary antioxidant: 0.1% Irganox 1010

Synergist: 0.25%

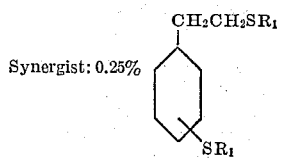

| $R_1$ | Average hours stabilization at 140° C. | Percent hours of DSTDP |
|---|---|---|
| n-C_{12}H_{25} | 1,347 | 80 |
| n-C_{16}H_{33} | 1,475 | 87 |
| DSTDP (Control) | 1,688 | |

TEST NO. 4
Stabilizers: 0.1% Irganox 1010
0.25% synergist

| Synergist | Average hours stabilization at 140° C. | Percent hours of DSTDP |
|---|---|---|
| $CH_2CH_2SCH_2CH_2COOC_{12}H_{25}$ (cyclohexane with $SCH_2CH_2COOC_{12}H_{25}$) (A liquid product) | 1,149 | 61 |
| $CH_2CH_2SC_{12}H_{25}$ (cyclohexane with $SC_{12}H_{25}$) | 1,611 | 86 |
| DSTDP (Control) | 1,872 | |

TEST NO. 5

Primary antioxidant: 0.1% Ionox 330

Synergist: 0.25%

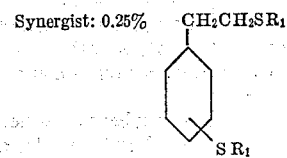

| $R_1$ | Average hours stabilization at 140° C. | Percent hours of DSTDP |
|---|---|---|
| n-$C_{18}H_{37}$ | 1,083 | 81 |
| n-$C_{20}H_{41}$ | 1,243 | 93 |
| DSTDP (Control) | 1,341 | |

TEST NO. 6

Stabilizers: 0.1% Topanol CA
0.25% synergist

| Synergist | Average hours stabilization at 140° C. | Percent hours of DSTDP |
|---|---|---|
| $CH_2CH_2SC_{16}H_{33}$ — cyclohexyl — $SC_{16}H_{33}$ | 507 | 100 |
| DSTDP (Control) | 507 | |

TEST NO. 7

Stabilizers: 0.1 Topanol CA
0.1% synergist

| Synergist | Average hours stabilization at 140° C. | Percent hours of DSTDP |
|---|---|---|
| $(C_{16}H_{33})_2S$ | 64 | 8 |
| $(C_{18}H_{37})_2S$ | 104 | 13 |
| $CH_2CH_2SC_{18}H_{37}$ — cyclohexyl — $SC_{18}H_{37}$ | 604 | 77 |
| DSTDP (Control) | 829 | |

TEST NO. 8

Stabilizers: 0.1% Topanol CA
0.25% synergist

| Synergist | Average hours stabilization at 140° C. | Percent hours of DSTDP |
|---|---|---|
| $(C_{16}H_{33})_2S$ | 96 | 11 |
| $(C_{18}H_{37})_2S$ | 181 | 20 |
| $CH_2CH_2SC_{16}H_{33}$ — cyclohexyl — $SC_{16}H_{33}$ | 731 | 80 |
| $CH_2CH_2SC_{18}H_{37}$ — cyclohexyl — $SC_{18}H_{37}$ | 712 | 78 |

| Synergist | Average hours stabilization at 140° C. | Percent hours of DSTDP |
|---|---|---|
| $CH_2CH_2SC_{22-28}H_{45-57}$ — cyclohexyl — $SC_{22-28}H_{45-57}$ | 840 | 92 |
| DSTDP (Control) | 912 | |

(See note)

NOTE.—Prepared as described above by 1:2 molar reaction of ($\beta$-(3(or 4))-mercaptocyclohexyl) ethanethiol with a commercially available $C_{22-28}$ normal alpha olefins mixture.

TEST NO. 9

Stabilizers: 0.1% Irganox 1010
0.25% synergist

| Polypropylene sample No. | Synergist (0.25%) | Average hours stabilization at 140° C. | Percent hours of DSTDP |
|---|---|---|---|
| 1 | $CH_2CH_2S$—branched $C_{13}H_{27}$ / cyclohexyl / S—branched $C_{13}H_{27}$ | 727 | 33 |
| 2 | $CH_2CH_2$—S—n—$C_{12}H_{25}$ / cyclohexyl / S—n—$C_{12}H_{25}$ | 1,611 | 86 |
| 3 | $CH_3$-cyclohexyl-S—n—$C_{16}H_{33}$ with $CH_3$, $CH_2S$—n—$C_{16}H_{33}$ | 1,566 | 71 |
| 4 | DLTDP | 1,603 | 73 |
| 5 | DSTDP (Control) | 2,193 | |

As can be seen, 2,9 - bis(hexadecylthio)-p-methane (Sample 3) is about as effective as the commercial DLTDP. Also evident is that branched higher alkyl groups (Sample 1) are relatively ineffective compared to straight-chain alkyls.

TEST NO. 10

In oven aging tests at 140° C. as above, polypropylene containing 0.1% Irganox 1010 and 0.1% dicyclopentadiene bis(hexadecyl sulfide) showed a stabilization without embrittlement about equivalent to the control of 0.1% Irganox 1010 and 0.1% DSTDP.

The compounds of this invention are particularly advantageous in that they are resistant to hot water leaching. This property is demonstrated by the following method:

Samples of polypropylene containing 0.1% Irganox 1010 plus 3.0% synergist were extruded and chopped to fine particle size. The samples (100 g.) were placed in an autoclave with 500 cc. distilled $H_2O$ and maintained at 100° C. for 48 hours with shaking. The sulfur content of the water from each sample was determined analytically and the percent synergist that leached from the polypropylene sample was calculated from the analyses. The results follow.

| Synergist: | Wt. percent leached |
|---|---|
| DLTDP | 0.75 |
| DSTDP | 0.71 |
| 1[β(octadecylthio)ethyl]3(or 4)-octadecylthio cyclohexane | 0.35 |

The conventional primary phenolic antioxidants which will be used with the olefinic polymers will include both monohydric and polyhydric phenols and include bisphenols, tris-phenols and tetrakis-phenols.

Monohydric phenols useful in the invention include those disclosed in U.S. 2,581,907 and include the following:

2,4-dimethyl-6-t-butylphenol
2,4-dimethyl-6-(alpha, alpha, gamma, gamma-tetramethylbutyl) phenol
2,6-di-t-butyl-4-methylphenol
2-methyl-4,6-di-t-butylphenol
2,6-di-t-butyl-4-sec-butylphenol
2,4,6-tri-t-butylphenol
2,4,6-triethylphenol
2,4,6-tri-n-propylphenol
2,4,6-triisopropylphenol
2,6-di-t-octyl-4-propylphenol
2,6-di-t-butyl-4-ethylphenol
2,4-dicyclohexyl-6-methylphenol
2-isopropyl-4-methyl-6-t-butylphenol
2,4-dimethyl-6-t-amylphenol
2,4-di-t-amyl-6-methylphenol
2,6-di-t-butyl-4-isopropylphenol
2,6-di-t-amyl-4-methylphenol
2,6-di-t-amyl-4-isopropylphenol
2,4-diisopropyl-6-t-butylphenol, and
2,4-diisopropyl-6-sec-hexylphenol The preferred compounds of this class are those which have secondary or tertiary alkyl groups at the 2- and 6-positions and a normal alkyl group at the 4-position, a representative of this class being 2,6-di-t-butyl-p-cresol. More preferably, the normal alkyl group in the 4-position is one containing from about 1 to 20 carbon atoms while the secondary or tertiary alkyl groups in the 2- and 6-positions each contain from about 3 to 20 carbon atoms. Any of the dialkylphenols are suitable; particularly preferred is the 2,6-di-t-butylphenol. The bisphenols are characterized by the general formula

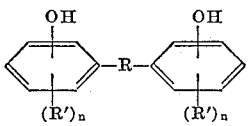

wherein R is an alkylidene radical of 1 to 5 carbon atoms, or is an ether or thioether group, and wherein R' is an alkyl group of 1 to 12 carbon atoms and n is an integer from 1 to 3. When more than one R' substituent is present on a phenyl group, each R' can be the same or different.

Exemplary of these alkylidene-bis(alkylphenols) that may be used are 2,2'-methylene-bis(5-isopropylphenol),
2,2'-methylene-bis(4-methyl-6-isopropylphenol),
2,2'-methylene-bis(4-methyl-6-t-butylphenol),
2,2'-methylene-bis(4-t-butyl-6-methylphenol),
2,2'-methylene-bis(4,6-di-t-butylphenol),
2,2'-methylene-bis(4-nonylphenol),
4,4'-methylene-bis(2,6-di-t-butylphenol),
2,2'-isopropylidene-bis(5-methylphenol),
4,4'-methylene-bis(2-methyl-6-t-butylphenol),
2,2'-ethylidene-bis(4-methyl-6-t-butylphenol),
2,2'-ethylidene-bis(4,6-di-t-butylphenol),
2,2'-ethylidene-bis(4-octylphenol),
2,2'-ethylidene-bis(4-nonylphenol),
2,2'-isopropylidene-bis(4-methyl-6-isopropylphenol),
2,2'-isopropylidene-bis(4-isopropylphenol),
2,2'-isopropylidene-bis(4-isopropyl-6-methylphenol),
2,2'-isopropylidene-bis(4-methyl-6-t-butylphenol),
2,2'-isopropylidene-bis(4-octylphenol),
2,2'-isopropylidene-bis(4-nonylphenol),
2,2'-isopropylidene-bis(4-decylphenol),
2,2'-isobutylidene-bis(4-methyl-6-t-butylphenol),
2,2'-isobutylidene-bis(4-nonylphenol),
4,4'-butylidene-bis(3-methyl-6-t-buytlphenol),
1,1'-thiobis-(2-naphthol),
Bis(3,5-di-tert.-butyl-4-hydroxybenzyl) ether,
2,2'-thiobis-(4-methyl-6-tert.-butylphenol), and
4,4'-thiobis-(5-methyl-2-tert.-butylphenol).

Of the tris-phenols useful 1,3,5-trimethyl-2,4,6-tris(3,5-di-tertiary-butyl-4-hydroxybenzyl) benzene and 1,3,5-trimethyl-2,4,6-tris(3,5-di-isopropyl-4-hydroxybenzyl) benzene and the like are typical.

Tetrakis-phenols useful are exemplified by compounds such as those of structure

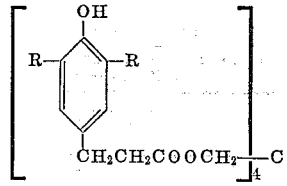

where R is lower alkyl. Preferred within this group is the compound where R is t-butyl.

The particular polyolefins which are to be treated in accord with this invention are any of the numerous polyolefin polymers. These will include the hydrocarbon polymers such as polyethylene, both conventional and the more recent higher density materials, polypropylene polybutene-1, poly-3-methyl-butene-1, poly-4-methylpentene-1, poly-4, 4-dimethylpentene-1, polydodecene-1, and poly-3-methyl-pentene-1, polybutadiene, polystyrene, etc. It will be understood, of course, that polymers derived from mixtures of appropirate olefins such as styrene-butadiene, acrylonitrile - butadiene-styrene, or ethylene-propylene-dicyclopentadiene may also be treated in accordance with the invention.

I claim:
1. Cycloalkane bis(alkylsulfides) selected from the group consisting of:

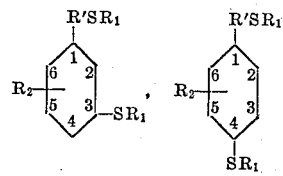

and

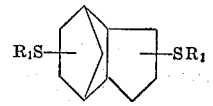

where $R_1$ is straight-chain alkyl groups of from about 8 to about 30 carbon atoms, $R_2$ is hydrogen, methyl or ethyl groups, and R' is an alkylene group of from two to about four carbon atoms.

2. A compound having the structure:

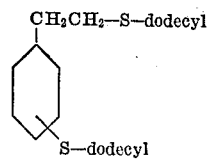

wherein the dodecylthio group on the cyclohexane ring is in the 3 or 4 position relative to the β dodecylthio-ethyl group.

3. A compound of claim 2 having the name 1-[β-(dodecylthio)ethyl]-3-dodecylthiocyclohexane.

4. A compound of claim 2 having the name 1-[β-(dodecylthio)ethyl]-4-dodecylthiocyclohexane.

5. A compound having the structure:

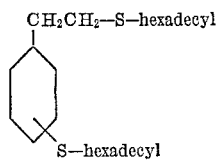

wherein the hexadecylthio group on the cyclohexane ring is in the 3 or 4 position relative to the β hexadecylthio-ethyl group.

6. A compound of claim 5 having the name 1-[β-(hexadecylthio)ethyl]-3-hexadecylthiocyclohexane.

7. A compound of claim 5 having the name 1-[β-(hexadecylthio)ethyl]-4-hexadecylthiocyclohexane.

8. A compound having the structure:

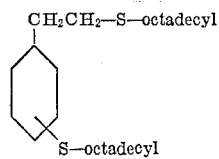

wherein the octadecylthio group on the cyclohexane ring is in the 3 or 4 position relative to the β octadecylthio-ethyl group.

9. A compound of claim 8 having the name 1-[β-(octadecylthio)ethyl]-3-octadecylthiocyclohexane.

10. A compound of claim 8 having the name 1-[β-(octadecylthio)ethyl]-4-octadecylthiocyclohexane.

11. A compound having the structure:

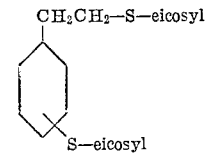

wherein the eicosylthio group on the cyclohexane ring is in the 3 or 4 position relative to the β eicosylthio-ethyl group.

12. A compound of claim 11 having the name 1-[β-(eicosylthio)ethyl]-3-eicosylthiocyclohexane.

13. A compound of claim 11 having the name 1-[β-(eicosylthio)ethyl]-4-eicosylthiocyclohexane.

14. 2,9-bis(hexadecylthio)-p-menthane.

15. 2,9-bis(octadecylthio)-p-menthane.

16. A compound having the structure

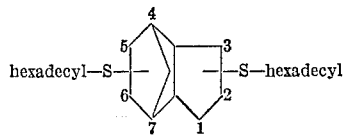

wherein the integers 1–7 identify positions on the structure and wherein the hexadecylthio groups are in the 2,5; 2,6; 3,5 or 3,6 position.

References Cited

Louthan: "Chem. Abstracts," vol. 57 (1962), p. 16404a.

LEWIS GOTTS, Primary Examiner

D. R. PHILLIPS, Assistant Examiner

U.S. Cl. X.R.

204—158 HE; 260—45.75, 45.95, , 609 B, 609 D

PO-1050
(5/69)

UNITED STATES PATENT OFFICE
CERTIFICATE OF CORRECTION

Patent No. 3,652,680  Dated  March 28, 1972

Inventor(s)  Bernard B. Buchholz

It is certified that error appears in the above-identified patent and that said Letters Patent are hereby corrected as shown below:

In column 2, line 9, the word "methine" should read -- menthane -- .

In column 2, line 36 the word "fltration" should read -- filtration -- .

In colunn 2, line 41, the formula "$C_{44}H_{88}C_2$" should read -- $C_{44}H_{88}S_2$ --.

In colunn 3, line 21, " 320 " should read -- 330 -- .

In column 4, line 31, " 7 " should read -- 77 -- .

In column 8, line 31, Insert a " comma (,)" between the words poly-propylene , poly- .

Signed and sealed this 25th day of July 1972.

(SEAL)
Attest:

EDWARD M. FLETCHER, JR.
Attesting Officer

ROBERT GOTTSCHALK
Commissioner of Patents